11/25/86 OR 4,625,092

United States Patent [19]

Camacho et al.

[11] Patent Number: 4,625,092

[45] Date of Patent: Nov. 25, 1986

[54] PLASMA ARC BULK AIR HEATING APPARATUS

[75] Inventors: David P. Camacho; Salvador L. Camacho, both of Raleigh, N.C.

[73] Assignee: Plasma Energy Corporation, Raleigh, N.C.

[21] Appl. No.: 676,657

[22] Filed: Nov. 30, 1984

[51] Int. Cl.$^4$ .............................................. B23K 15/00

[52] U.S. Cl. ...................... 219/121 PM; 219/121 PP; 219/121 PQ; 313/231.41

[58] Field of Search ...... 219/121 P, 121 PM, 121 PP, 219/121 PQ, 121 PR, 75, 74; 313/231.21, 231.31, 231.41; 315/111.21

[56] References Cited

U.S. PATENT DOCUMENTS

| | | | |
|---|---|---|---|
| 3,294,952 | 12/1966 | Eschenbach | 219/121 P |
| 3,533,756 | 10/1970 | Houseman | 219/121 P |
| 3,858,072 | 12/1974 | Dembovsky | 219/121 PP |
| 3,935,371 | 1/1976 | Camacho et al. | 219/121 P |
| 3,940,641 | 2/1976 | Dooley | 219/121 P |
| 4,060,708 | 11/1977 | Walters | 219/121 PR |
| 4,284,879 | 8/1981 | Eveson et al. | 219/121 P |

FOREIGN PATENT DOCUMENTS

| | | |
|---|---|---|
| 1105479 | 3/1968 | United Kingdom . |
| 1114809 | 5/1968 | United Kingdom . |
| 1326429 | 8/1973 | United Kingdom . |

*Primary Examiner*—M. H. Paschall
*Attorney, Agent, or Firm*—Bell, Seltzer, Park & Gibson

[57] ABSTRACT

A plasma arc heating apparatus is disclosed which is adapted for heating large quantities of air for commercial and industrial uses, and which comprises a housing including an elongate heating chamber, a tubular front electrode mounted at one end of the housing, and a plasma arc torch mounted at the other end of the housing. The torch is mounted for movement toward and away from the front electrode and a power supply system is provided for establishing an arc which extends from a rear electrode in the torch through the heating chamber and to the front electrode at the opposite end of the housing. Structure are also provided for introducing a gas to be heated into the chamber between the torch and the front electrode, and such that the gas is heated by the arc and flows outwardly through the front electrode. To increase the heating capacity of the apparatus, the torch is withdrawn from the front electrode, thereby extending the length of the arc and thus the power available for heating the gas delivered into the chamber. Also, the mass flow rate of the gas entering the heating chamber may be varied as dictated by the heating requirements.

12 Claims, 5 Drawing Figures

CONTROL FOR MAGNETIC ROTATION OF ARC
CONTROL RESPONSIVE TO TORCH POSITION
DC POWER SUPPLY
NEG.
POS.
AIR SOURCE
PRESSURE CONTROL
AIR VALVES
PRESSURE CONTROL
COOLING WATER

PLASMA ARC BULK AIR HEATING APPARATUS

The present invention relates to an apparatus utilizing a plasma arc for heating large quantities of air for commercial and industrial uses.

Present systems for drying various raw materials on a commercial or industrial scale typically involve the heating of large quantities of air by the combustion of a fossil fuel, and using the heated air to evaporate the moisture content of the raw materials. Such systems have several disadvantages, including the fact that the fuel must be transported, stored and used in a carefully designed manner so as to avoid fire or explosion. In addition, the burning of the fuel may create air pollution, and the combustion process itself creates moisture which lowers the moisture removal capability of the heated air.

In order to eliminate the disadvantages of burning fossil fuels, it has heretofore been proposed to utilize an electrical arc for heating large quantities of air. In one prior electrical apparatus, known in the art as a free arc length torch, there are provided spaced apart rear and front electrodes, with an electrical power system for generating an arc between the two electrodes. Means are also provided for introducing a variable quantity of air between the two electrodes so that the air is heated by the arc and exhausted forwardly through the front electrode into an appropriate furnace which contains the materials to be dried.

It is recognized in the art that the power or heat energy which may be delivered to the air to be heated by an electrical arc is directly proportional to the length of the arc, and thus it is desirable to be able to change the length of the arc to control the degree of heating. Thus for example, it is desirable to maximize the length of the arc to achieve a high level of heating. In the free arc length torch, the amount of air introduced controls to some degree the length of the arc, but the amount of this change and thus the maximum heating potential of the torch is limited by reason of the fact that too much air will extinguish the arc.

In another proposed electrical heating apparatus, known in the art as a fixed arc length torch, the front electrode comprises a series of axially aligned and spaced apart segments. The arc initially attaches to the segment of the front electrode which is closest to the rear electrode, and the arc is then moved or "walked" forwardly to the outer most segment to extend the arc length, which is accomplished by selectively controlling the introduction of air between the segments and while electrically isolating the inner segments. Thus upon reaching the outermost segment, the arc attachment point cannot move back. However, this type of apparatus is structurally complex in that insulation is required between the electrode segments, and the electrical and air controls for advancing the arc are relatively complex. In addition, the operating power level is not readily adjustable since the electrode segments are designed only for temporary arc attachment, and thus the arc must be maintained at its full operating length.

It is accordingly an object of the present invention to provide an apparatus utilizing an electrical arc for the bulk heating of a gas for commercial and industrial uses, and which substantially alleviates the above described disadvantages and limitations of the known apparatus of this type.

It is a more particular object of the present invention to provide a plasma arc torch adapted for the bulk heating of a gas, with provision for widely varying the heating capacity of the torch by varying the arc length, and with provision for varying the mass flow rate of the gas being heated by the arc in order to optimize the efficiency of the arc.

These and other objects and advantages of the present invention are achieved in the embodiment illustrated herewith by the provision of a plasma arc heating apparatus which comprises a support housing which includes an elongate heating chamber therein, a tubular front electrode mounted at one end of the chamber, and a plasma arc torch which includes a rear electrode mounted at the opposite end of the chamber. In the preferred embodiment, the front electrode is fixedly mounted to the housing, and the torch is mounted for selective movement axially into the heating chamber and toward the front electrode. In addition, power supply means is provided for generating an arc which is adapted to extend axially from the rear electrode through the heating chamber and to the front electrode. Further, there is provided means for introducing a gas to be heated into the heating chamber between the torch and the front electrode, and such that the gas is heated by the arc and flows outwardly through the front electrode. By this arrangement, the length of the arc, and thus the power available for heating the gas delivered to the chamber, may be varied by changing the axial separation of the torch and the front electrode.

As a further aspect of the present invention, the amount of the gas introduced into the heating chamber may be selectively varied. This permits the arc length and the mass flow rate of the gas to be coordinated to optimize the efficiency of the apparatus in meeting the particular heating requirements of the apparatus. Thus for example, the length of the arc may be increased by separating the torch from the front electrode, which permits the power and thus the air heating capacity to be increased. In addition, the mass flow rate of the gas to be heated and which is introduced into the chamber may be appropriately increased so that the temperature may be maintained at the same level while increasing the heating capacity of the apparatus to meet the external heating requirements. Preferably, control means are provided whereby the mass flow rate of the gas into the chamber automatically increases as a function of the separation distance between the torch and front electrode. Also, it is preferred that the gas be introduced into the heating chamber in a vortical flow path, to better stabilize the arc in the heating chamber.

Some of the objects and advantages having been stated, others will appear as the description proceeds, when taken in conjunction with the accompanying drawings, in which FIG. 1 is a somewhat schematic perspective view of a plasma arc heating apparatus which embodies the features of the present invention;

Figure 1:
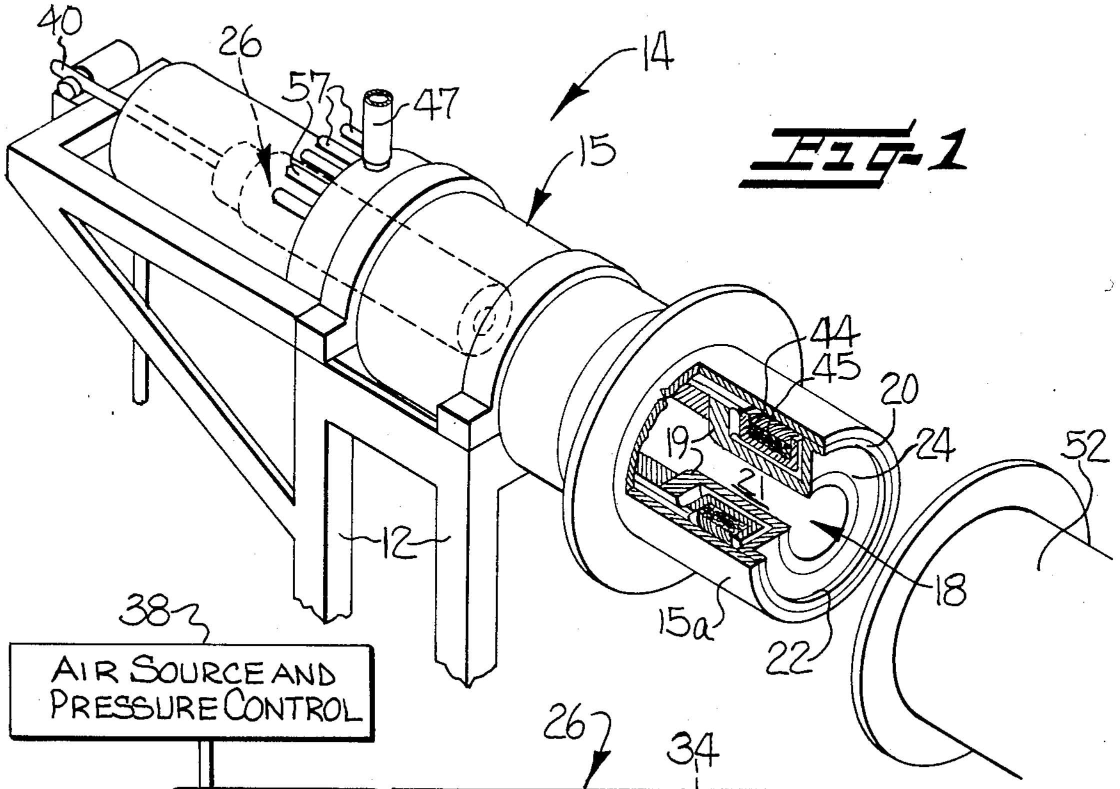
Figures 4, 5:
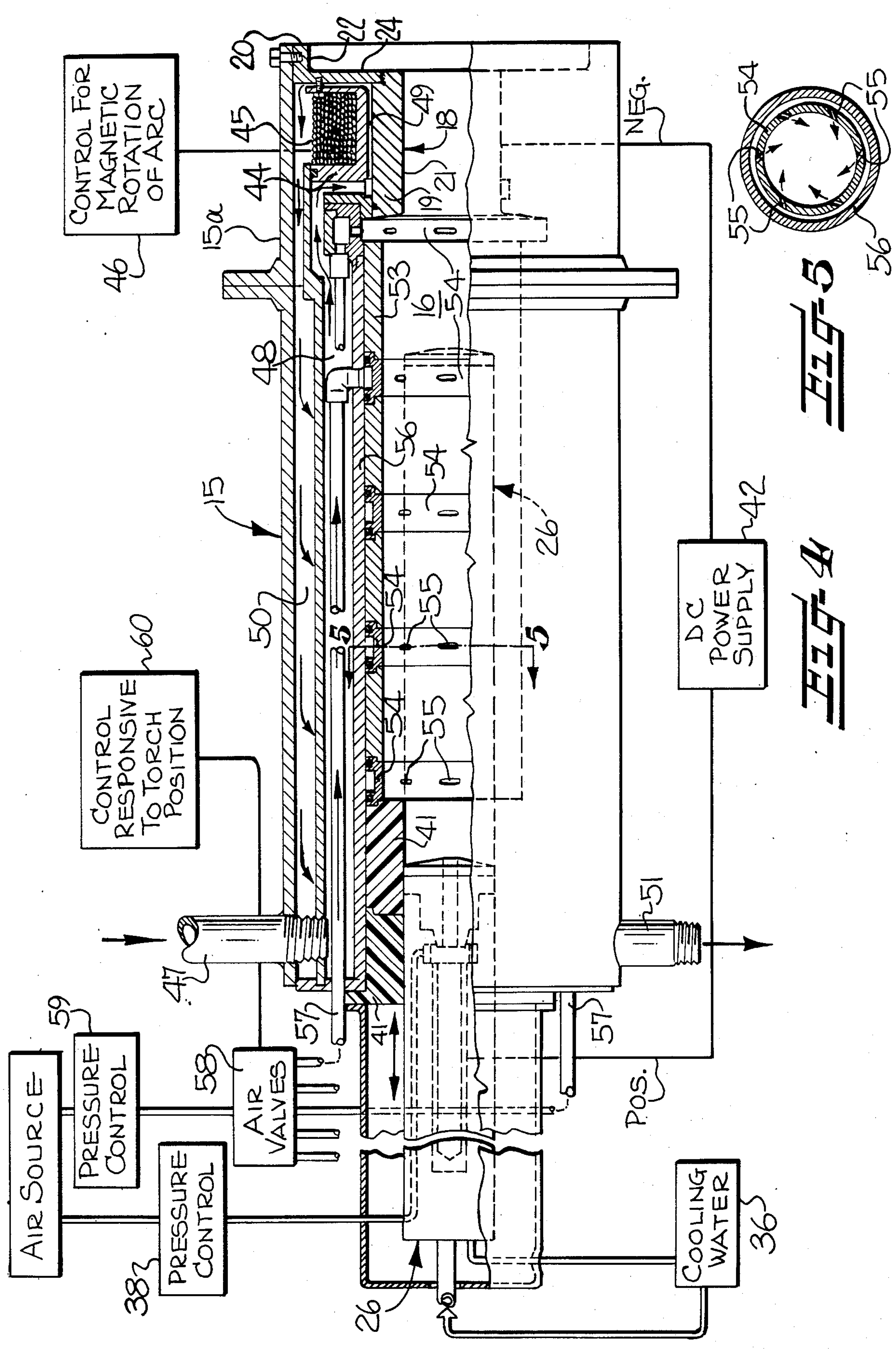
FIG. 4 is a somewhat schematic and partly sectioned side elevation view of the heating apparatus shown in FIG. 1.
FIG. 5 is a fragmentary sectional view of one of the rings of openings for introducing air into the heating chamber of the apparatus.

Referring more particularly to the drawings, FIGS. 1 and 4 illustrate a plasma arc heating apparatus in accordance with the present invention and which comprises a support frame 12 which mounts a housing generally indicated at 14. The housing 14 includes an outer generally cylindrical cover 15, which includes a removable front segment 15*a*. Also, the housing mounts an elongate generally cylindrical heating chamber 16 disposed coaxially within the cover.

A tubular front electrode 18 is fixedly mounted within the cover of the housing and at one end of the elongate heating chamber 16. The front electrode 18 is composed of two components, namely a cylindrical inner member 19, and an outer flange 20 which is threadedly mounted at the outer end of the inner member 19. The inner member 19 defines a tubular inner bore portion 21 which is in coaxial alignment with the axis of the heating chamber, and the flange 20 defines a cup shaped outer bore portion 22 which defines a forwardly facing radial shoulder 24. The threaded interconnection between the flange 20 and inner member 19 permits the flange to be easily replaced upon the surface of the radial shoulder 24 becoming eroded from the arc attachment, as further described below.

Figure 2:
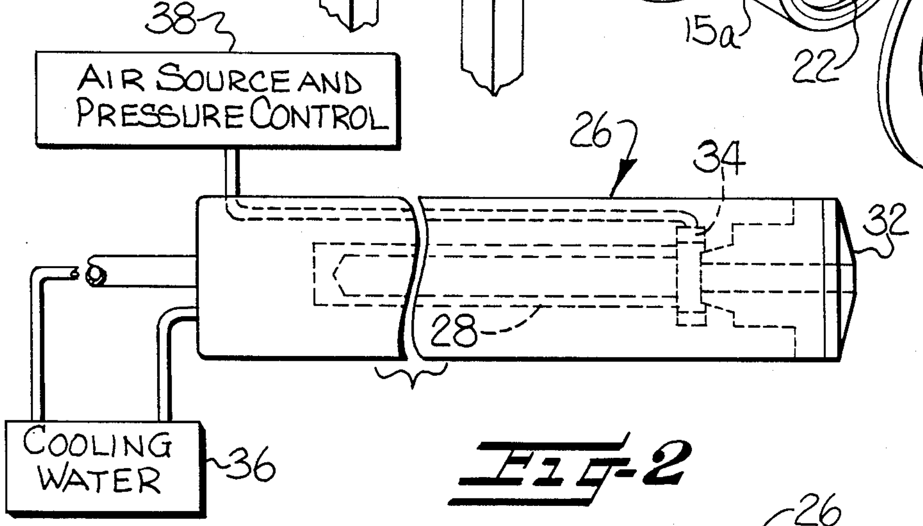
FIG. 2 is a side elevation view of a plasma arc torch utilized in the heating apparatus of the present invention, and which illustrates some of the internal components in dashed lines.
Figure 3:
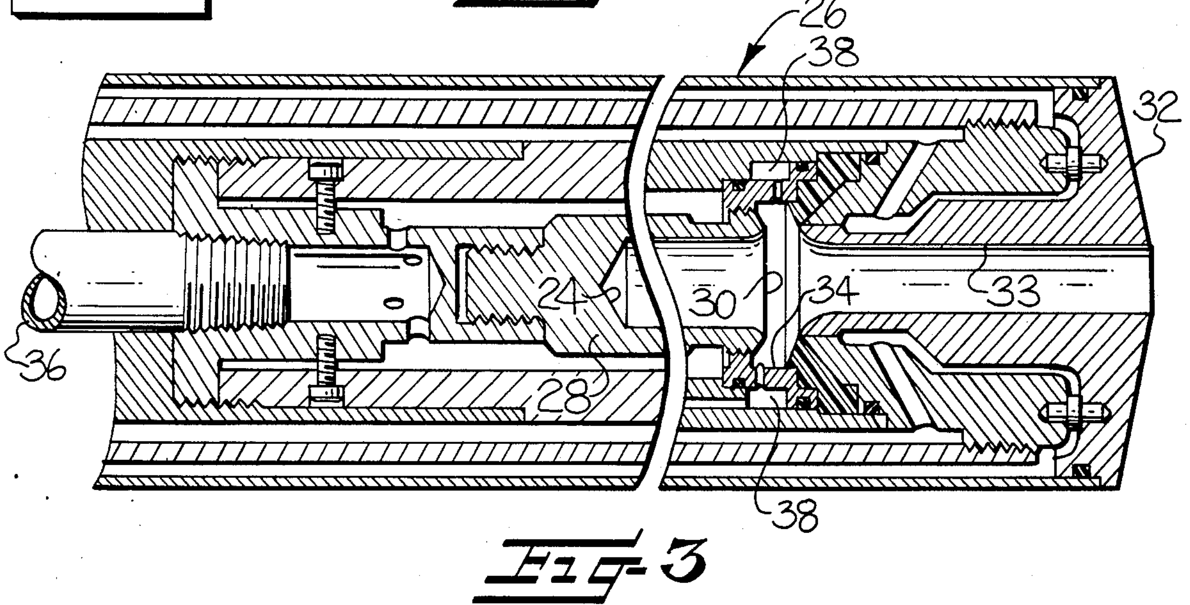
FIG. 3 is an enlarged sectional side elevation view of the torch shown in FIG. 2.

A plasma arc torch 26 is mounted to the housing 14 at the opposite end of the heating chamber 16. The torch 26 is best illustrated in FIGS. 2 and 3, and it includes an internal rear electrode 28 having a closed inner end 29 and an open outer end 30. A collimating nozzle 32 is mounted adjacent but spaced from the rear electrode 28, with the collimating nozzle including a central bore 33 which is axially aligned with the rear electrode. Also, it will be seen that the rear electrode 28 and the nozzle 32 are axially aligned with the heating chamber 16 and the front electrode 18. The diameter of the central bore 33 of the nozzle 32 will be seen to be substantially less than the diameter of the inner bore portion 21 of the front electrode, and it is believed that the diameter of the bore portion 21 should not be greater than about $2\frac{1}{2}$ times the diameter of the central bore 33 for proper arc stabilization. Further, the torch 26 includes vortex generating means 34 for generating a vortical flow of a gas at a location intermediate the rear electrode and the nozzle.

The plasma arc torch 26 further includes internal coolant flow path means 36 whereby the heat absorbed by the rear electrode 28 and the nozzle 32 may be dissipated. In addition, the torch 26 includes an air supply system 38 for delivering air to the vortex generator 34. Further details regarding the internal structure of the torch 26 may be obtained from applicants' copending patent application Ser. No. 460,062, or the U.S. patents to Camacho, U.S. Pat. Nos. 3,673,375 and 3,818,174, the disclosures of which are expressly incorporated herein by reference.

The heating apparatus of the present invention further includes means for mounting the plasma arc torch 26 to the housing 14 to permit selective movement partially into the heating chamber 16 and toward and away from the front electrode 18. More particularly, the torch is slideably supported by a pair of annular supports 41, which are mounted at one end of the housing and which are composed of an electrically insulating plastic material so as to electrically isolate the torch from the housing. As seen in FIG. 4, the torch 26 is illustrated in its axially withdrawn position, with the forwardmost position being illustrated in dashed lines. An actuating rod 40 (FIG. 1) may be suitably fixed to the rear of the torch for effecting the desired sliding movement thereof.

The heating apparatus further comprises a direct current power supply means 42 which is operatively connected to the rear electrode 28 of the plasma arc torch and to the front electrode 18, for generating an arc which is adapted to extend axially from the rear electrode 28 through the vortex generator 34 and the nozzle 32, and to the front electrode 18. By proper coordination of the level of power, and the amount of the air delivered to the vortex generator 34 and chamber 16 as described below, the arc may be made to attach to the radial shoulder 24 of the front electrode. Thus any erosion of the material of the front electrode will occur along an axial path of travel rather than radially through the electrode. Upon the flange 20 becoming excessively eroded, the front segment 15*a* may be released from the remaining portion of the cover, and so as to permit the flange to be released from the housing 14 and unthreaded from the inner member 19 and replaced with a new flange. As illustrated, the positive side of the direct current power supply is connected to the rear electrode 28, and the negative or grounded side of the power supply is connected to the front electrode 18.

As best seen in FIG. 4, a spool-like annular housing 44 which includes a wire coil 45 may be disposed coaxially about the inner member 19 of the front electrode. The coil 45 is energized by a suitable control 46 for the purpose of generating a rotating magnetic field about the inner member. The rotating field causes the arc attachment point to move in a circular path of travel around the radial shoulder 24, to thereby distribute the erosion and further increase the life of the front electrode. Also, a water coolant system may be provided for the housing 14, to remove heat from the heating chamber 16 and the front electrode 18. In the illustrated embodiment, the coolant system includes an inlet 47 and an annular chamber 48 for conducting the water forwardly through the housing 14 to the spool-like annular housing 44. The housing 44 is spaced a small distance from the inner member 19 to provide a narrow, high velocity annular water passage 49 therebetween. A second annular chamber 50 is provided for conducting the water rearwardly to the outlet 51.

The heating apparatus further includes means for introducing a gas to be heated (usually air) into the heating chamber 16 and between the torch 26 and the front electrode 18. Thus the introduced air is heated by the arc and flows outwardly through the front electrode into a suitable furnace, burner port, or the like which is indicated generally at 52 in FIG. 1, and wherein the heated air may be exposed to a raw material for drying purposes or other industrial use of the heat energy.

The means for introducing the air comprises a total of five axially spaced apart annular rings 54, with each ring including a plurality of openings 55 which open tangentially into the heating chamber in the manner best seen in FIG. 5. The rings are separated by refractory tubes 53 which form the inner wall of the heating chamber, and the tubes 53 and rings 54 are covered by a tubular metal jacket 56. Each ring 54 is connected to an air line 57 which extends rearwardly through the cover 15, and each of these lines 57 preferably includes a valve 58 for selectively connecting the line to a source of pressurized air via a pressure control 59. Thus the mass flow rate of the air into the chamber may be controlled by selectively varying the number of valves 58 which are open and the pressure of the air. Preferably, the mass flow rate of the air introduced into the chamber is a function of the separation between the torch 26 and the front electrode 18, with an increased separation resulting in an increased flow rate. For this purpose, automatic control means 60 may be provided which is responsive to the position of the torch for opening the valves to the individual rings 54 in a sequence controlled by the rearward movement of the torch. As indicated in FIG. 4, the torch 26 is adapted to overlie at least some of the rings 54 upon the torch being advanced into the heating chamber. Preferably, the control means 60 is programmed to automatically actuate the valves 58 such that the openings 55 of those rings over which the torch lies are closed, and the openings 55 of those rings between the torch and the front electrode 18 are open.

The tangential openings 55 in each of the rings 54 are correspondingly oriented so as to create a vortical flow of the air within the heating chamber, which is believed to be helpful in centrally stabilizing the arc. Also, it is important that the wall of the chamber 16 be maintained at a relatively cool temperature in order to avoid attachment of the arc to the chamber wall, and the illustrated spaced apart arrangement of the rings 54 serves to provide relatively cool air along the full length of the chamber wall for this purpose.

To initiate operation of the apparatus, the torch 26 is initially moved to the forwardmost or starting position as shown in dashed lines in FIG. 4. The power system and the air supply system for at least the forward-most ring of openings are actuated, resulting in the arc being established between the rear electrode 28 of the torch and the front electrode 18. The air being introduced into the heating chamber is heated by the arc, and the heated air moves forwardly through the front electrode 18 to the furnace 52. As the heating requirements of the furnace increase, the torch is withdrawn rearwardly, to extend the arc length and thus increase the power being utilized. Concurrently, additional air may be introduced into the chamber by opening the valves 58 to additional rings 54, to provide a mass flow rate dictated by the heating requirements.

In the drawings and specification, there has been set forth a preferred embodiment of the invention, and although specific terms are employed, they are used in a generic and descriptive sense only and not for purposes of limitation.

That which is claimed is:

1. A plasma are heating apparatus adapted for heating large quantities of a gas, such as air, for commercial or industrial uses, and comprising a support housing including an elongate heating chamber therein, a tubular front electrode mounted at one end of said heating chamber and in axial alignment therewith, a plasma arc torch mounted to said housing at the opposite end of said heating chamber and including a rear electrode, a collimating nozzle adjacent but spaced from said rear electrode, with said rear electrode and nozzle being axially aligned with said elongate heating chamber and said front electrode, and vortex generating means for generating a vortical flow of a gas at a location intermediate said rear electrode and said nozzle, means mounting said front electrode and said plasma arc torch to said housing for selective relative movement axially toward and away from each other, power supply means operatively connected to said rear electrode of said plasma arc torch and said front electrode for generating an arc which is adapted to extend axially from said rear electrode through said vertical flow of gas and said nozzle and to said front electrode, and means for introducing a variable amount of a gas to be heated into said heating chamber between said plasma arc torch and said front electrode, and such that the gas is heated by said arc and flows outwardly through said front electrode, said gas introducing means comprising a plurality of axially spaced apart rings of entry openings in said chamber, and a plurality of gas delivery lines connected to respective ones of said rings so that the openings of each ring receive gas from an individual one of said lines, and valve means for selectively opening and closing each of said gas delivery lines, whereby the length of the arc, and thus the power available for heating the gas introduced into said heating chamber, may be varied by changing the axial separation between the torch and front electrode, and the temperature of the gas may be controlled by controlling the amount of the gas introduced into the heating chamber.

2. The plasma are heating apparatus as defined in claim 1 wherein said means for introducing a gas to be heated into said heating chamber further includes control means for automatically actuating said valve means to open and close said entry openings in response to the positioning of said torch relative to said front electrode, and such that the amount of gas introduced into said chamber is a function of the separation between the torch and front electrode.

3. The plasma arc heating apparatus as defined in claim 1 wherein said front electrode includes a central bore therethrough which comprises a generally cylindrical inner portion and a cup shaped outer portion which defines an outwardly facing radial shoulder, and such that the arc generated by said power supply means is adapted to extend through said central bore and attach to said radial shoulder.

4. The plasma arc heating apparatus as defined in claim 3 wherein said front electrode comprises a cylindrical inner member which defines said inner portion of said central bore, and an outer flange which defines said outwardly facing radial shoulder of said outer portion of said bore, with said outer flange being releasably mounted to said cylindrical inner member.

5. The plasma arc heating apparatus as defined in claim 3 further comprising electromagnetic means for generating a rotating magnetic field about said front electrode, and such that said arc attachment point moves in a circular path around said radial shoulder.

6. The plasma arc heating apparatus as defined in claim 3 wherein said power supply means comprises a direct current power supply having a positive side connected to said rear electrode and a negative side connected to said front electrode.

7. The plasma are heating apparatus as defined in claim 1 further comprising coolant flow path means operatively contacting said torch and said fron electrode, and such that a fluid coolant may be circulated through said flow path means to remove heat from said torch and from said front electrode.

8. The plasma arc heating apparatus as defined in claim 1 wherein said entry openings of each of said rings are directed in a tangential direction so as to create a vortical flow of the gas in said heating chamber.

9. A plasma arc heating apparatus adapted for heating large quantities of a gas, such as air, for commercial or inductrial uses, and comprising a support housing including an elongate heating chamber therein, a tubular front electrode fixedly mounted at one end of said heating chamber and in axial alignment therewith, a plasma arc torch mounted to said housing at the opposite end of said heating chamber and including a rear electrode, a collimating nozzle adjacent but spaced from said rear electrode, with said rear electrode and nozzle being axially aligned with said elongate heating chamber and said front electrode, and vortex generating means for generating a vortical flow of a gas at a location intermediate said rear electrode and said nozzle.

means mounting said torch to said housing for selective movement axially into said heating chamber and toward said front electrode, power supply means operatively connected to said rear electrode of said plasma arc torch and said front electrode for generating an arc which is adapted to extend axially from said rear electrode through said vortical flow of gas and said nozzle and to said front electrode, and means for introducing a gas to be heated into said heating chamber between said plasma arc torch and said front electrode, and such that the gas is heated by said arc and flows outwardly through said front electrode, said gas introducing means comprising a plurality of axially spaced apart entry openings in said chamber which are tangentially oriented so as to provide a vortical flow path of the gas within said heating chamber, and valve means for selectively opening and closing selected ones of said entry openings, and such that said torch is adapted to overlie at least some of said openings upon being selectively moved into said heating chamber, whereby the length of the arc, and thus the power available for heating the gas delivered to said heating chamber, may be varied by changing the axial separation between the torch and front electrode.

10. The plasma are heating apparatus as defined in claim 9 wherein said means for introducing a gas to be heated into said heating chamber further includes control means for automatically actuating said valve means to open and close said entry openings in response to the positioning of said torch in said heating chamber, and such that upon advance of said torch into said heating chamber those openings over which the torch lies are closed.

11. The plasma arc heating apparatus as defined in claim 9 wherein said means mounting said torch to said housing includes means for electrically insulating said torch from said housing.

12. The plasma arc heating apparatus as defined in claim 10 wherein said entry openings are in the form of a plurality of axially spaced apart rings, with each ring including a plurality of openings which open tangentially into said heating chamber.

* * * * *